Figure 1:
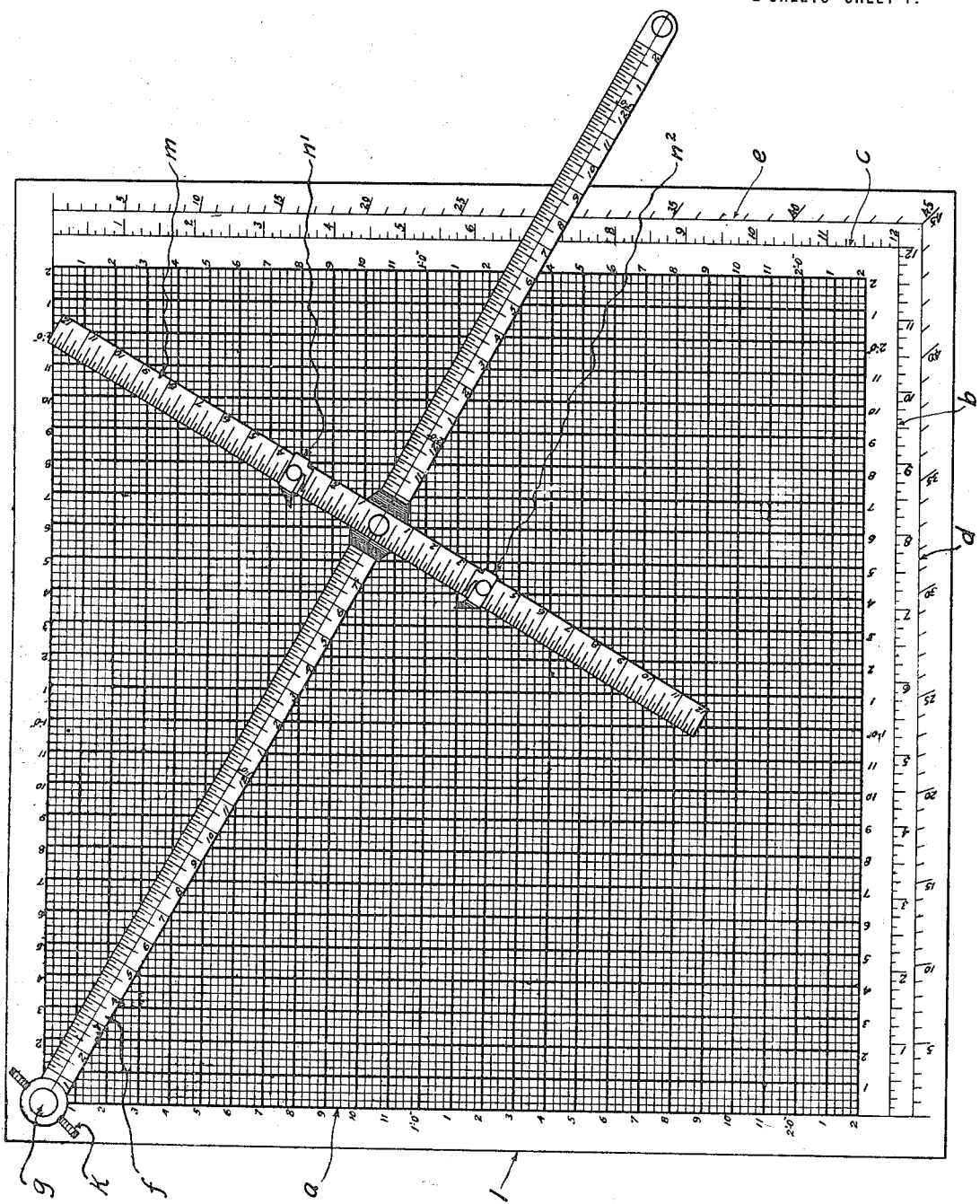

M. N. PILGREN.
PROTRACTOR.
APPLICATION FILED APR. 16, 1915.

1,196,581.

Patented Aug. 29, 1916.
2 SHEETS—SHEET 1.

Inventor
Martin N. Pilgren

By
Attorney

M. N. PILGREN.
PROTRACTOR.
APPLICATION FILED APR. 16, 1915.
1,196,581.
Patented Aug. 29, 1916.
2 SHEETS—SHEET 2.
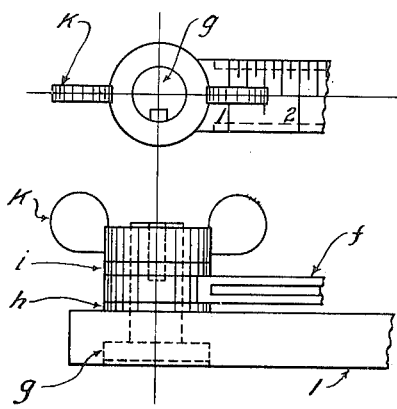
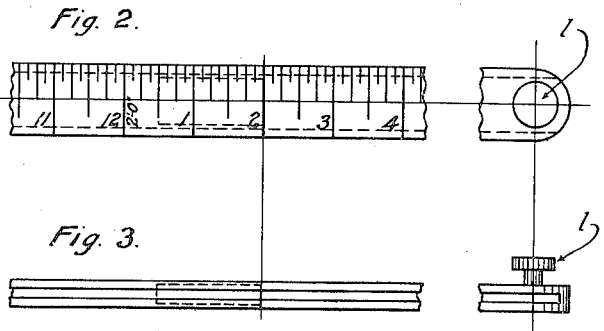
Fig. 2.
Fig. 3.
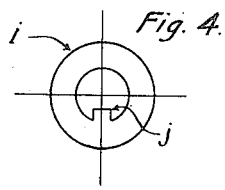
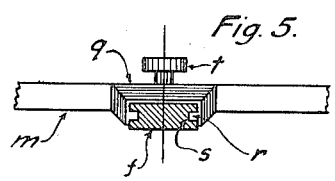
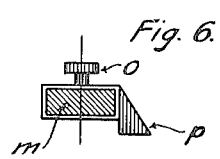
Fig. 4.
Fig. 5.
Fig. 6.
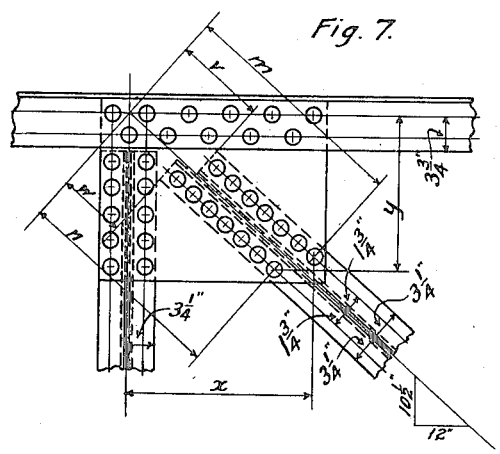
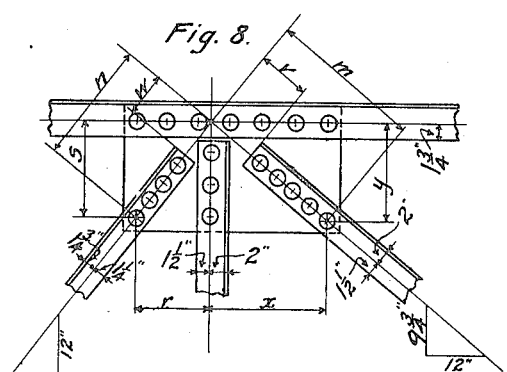
Fig. 7.
Fig. 8.
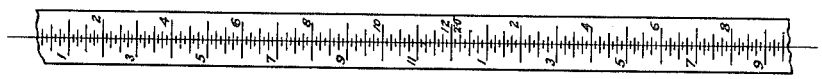
Fig. 9.
Inventor
Martin N. Pilgren,
By 
Attorney

UNITED STATES PATENT OFFICE.

MARTIN N. PILGREN, OF BROOKLYN, NEW YORK.

PROTRACTOR.

1,196,581.

Specification of Letters Patent.

Patented Aug. 29, 1916.

Application filed April 16, 1915. Serial No. 21,715.

*To all whom it may concern:*

Be it known that I, MARTIN N. PILGREN, a citizen of the United States, residing at Brooklyn, in the county of Kings and State of New York, have invented certain new and useful Improvements in Protractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to protractors, and is designed primarily for obtaining certain measurements required in detailing diagonal truss members and other diagonals which ordinarily require very careful and tedious layouts.

It comprises essentially a rectangular base-plate having a surface graduated into cross sections of feet, inches and fractional parts of inches, an adjustable diagonal scale, and a transverse scale.

An embodiment of the invention is illustrated in the accompanying drawings, in which—

Figure 1 is a plan view of the instrument; Fig. 2 an enlarged fragmentary plan view of the diagonal scale; Fig. 3 an enlarged fragmentary side view of the diagonal scale; Fig. 4 a plan view of one of the washers by which the diagonal scale is pivotally attached to the base-plate; Fig. 5 is a section through the diagonal scale at the junction of the transverse scale therewith, showing the grooved edges along which the transverse scale slides; Fig. 6 is a section through the transverse scale, showing an end view of one of the sliding indexes mounted on the transverse scale; Figs. 7 and 8 are views representing typical problems to be solved by use of the instrument. Fig. 9 is a fragmentary plan view of the transverse scale formed of transparent celluloid or other suitable transparent material.

In the drawings the numeral 1 designates the base-plate made of wood or other suitable material and having its surface, $a$, graduated into cross sections of feet, inches and fractions thereof as illustrated. The surface is preferably covered with white celluloid or paper upon which the graduations mentioned are made. Immediately below and also to the right of the graduated surface of the base-plate is a horizontal and a vertical scale, $b$ and $c$, respectively, each representing, say, one foot divided into inches and fractional parts thereof, and parallel to these scales on the extreme lower and right hand edges of the base-plate are protractor scales, $d$ and $e$, respectively, each of which subtends an angle of 45°.

The diagonal scale bar, represented by $f$, which is pivoted at the upper left hand corner of the base-plate is graduated into feet, inches, and fractions thereof, and has a center line extending throughout its length as indicated. It may be made in two parts as indicated by Figs. 2 and 3 or in one part as preferred. If in one part it may be made of celluloid or other suitable translucent or transparent material, and in such case its graduations are applied as illustrated in Fig. 9 of the drawing. If made of two parts as illustrated in Figs. 1, 2 and 3, the part next to its pivoted end may be made of metal, or other suitable material, and at the point of its scale coinciding with the corresponding scale marking at the edge of the base-plate surface graduations, in either the vertical or horizontal disposition of the diagonal-scale bar, will be attached the other part of the scale bar which may be made of celluloid or other transparent or translucent material, the end of one part fitting into a socket in the end of the other part as indicated by dotted lines in Figs. 2 and 3 of the drawing. The transparent or translucent extension or part is provided in order that the intersection of the center line of the diagonal scale bar with the two scales at the lower and the right hand sides of the base-plate may be seen through it. Accordingly this observation is made possible whether the diagonal scale bar is made only partially or wholly of transparent or translucent material. This diagonal scale bar is pivotally connected to the upper left hand corner of the base-plate by a pivot bolt, $g$, the head of which is counter-sunk into the underside of the base-plate as indicated in Fig. 3 of the drawing. Between the base-plate and the diagonal scale bar a washer $h$ is fitted over the bolt, and on top of the diagonal scale bar is another washer $i$ which has a tongue $j$ fitting in a corresponding slot in the bolt so that when the thumb nut $k$ is screwed down the position of the diagonal scale bar will not be disturbed. The opposite or free end of this bar is provided with a thumb piece or stud 1 by which the bar may be manipulated.

At right angles to the diagonal scale bar and mounted to slide thereon is a transverse scale bar $m$. This bar is made of metal, or other suitable material, and is graduated to opposite sides of the center line of the diagonal scale bar into feet, inches, and fractions thereof. It is provided with indexes $n^1$ and $n^2$ mounted to slide thereon in frictional contact therewith and which may have thumb pieces $o$ to be grasped in sliding the indexes. Each index is provided with a pointer $p$, the pointer of one being made opposite hand to the other. The transverse scale bar $m$ may be mounted on the diagonal scale bar in any suitable way, for instance by a sleeve $q$ which may have tongues $r$ fitting in grooves $s$ in the side edges of the diagonal scale bar, and which may be provided with a thumb piece $t$ for moving the bar.

The instrument is operated as follows: In Fig. 7 to find distances $v$ and $w$. First lay off the known distance $3\frac{1}{4}''$ on each side of the transverse scale bar by moving the indexes $n$ to these distances on the scale; then adjust the scale to the given bevel by moving it along the vertical scale on the right hand side of the base-plate until the center line coincides with the point $10\frac{1}{2}''$ on the vertical scale. Now slide the transverse scale along the diagonal scale until the index $n^1$ approaches the horizontal line $4''$ from the top of the base plate, which represents the distance from the working line on the top chord member to its lower edge, allowing a clearance of $\frac{1}{4}''$. The distance $v$ is now indicated on the diagonal scale. In like manner the distance $w$ is obtained by sliding the transverse scale until the index $n^2$ approaches the vertical line $3\frac{1}{4}''$ from the left hand side of the base plate, which represents the distance from the center line of the vertical truss member to its inside edge, allowing a clearance of $\frac{1}{4}''$. The values of $v$ and $w$ being known, the distances $m$ and $n$ are readily determined.

In order to determine the size of the gusset plate the distances $x$ and $y$ are required. Lay off $1\frac{3}{4}''$ on each side of the transverse scale by moving the indexes $n^1$ and $n^2$ to these values, then slide the transverse scale along the diagonal scale through the distance $m$. The distance $x$ is now indicated on the graduated base from the left hand side to the point of index $n^1$. Next slide the transverse scale through distance $n$ and the required distance $y$ will be indicated on the graduated base from the top to the point of index $n^2$.

The values of $v$ and $w$ in Fig. 8 are obtained in the same manner as their corresponding values in Fig. 7. The values of $x$ and $y$ are obtained directly by sliding the transverse scale through the distance $m$ and reading the values of the vertical and horizontal components on the graduated base. The values of $r$ and $s$ are similarly obtained.

The protractor scales on the base-plate are supplied in order that the bevel of the diagonal may be obtained directly by laying off the known angle or vice versa.

I have illustrated and described the preferred details of construction of the several parts of the instrument but changes may be made therein and in the material without departing from the essential features of the invention.

Having described my invention and set forth its merits what I claim is:

1. The instrument described comprising a base plate having a graduated surface representing sub-divisions of feet and fractions thereof and provided with a marginal graduated scale supplemental to the scale of the base plate subdivisions, a pivoted diagonal graduated bar formed to have its graduations extend over the marginal graduated scale, and a transverse scale bar slidably mounted on the diagonal bar and graduated at opposite sides thereof.

2. The instrument described comprising a base plate having a graduated surface representing sub-divisions of feet and fractions thereof and provided with a marginal graduated scale, and with a protractor scale arranged parallel therewith, a pivoted diagonal graduated bar formed to have its graduations extend over the marginal graduated scale and protractor scale, and a transverse scale bar slidably mounted on the diagonal bar and graduated at opposite sides thereof.

3. The instrument described comprising a graduated surface representing subdivisions of feet and fractions thereof and provided with a marginal graduated scale, a pivoted diagonal graduated bar formed to have its graduations extend over the marginal graduated scale, a transverse scale bar slidably mounted on the diagonal scale bar and graduated at opposite sides thereof, and indexes slidably mounted on the transverse scale bar, one at each side of the diagonal scale bar.

In testimony whereof I affix my signature in presence of two witnesses.

MARTIN N. PILGREN.

Witnesses:
CHAS. S. HYER,
WM. G. HENDERSON.